April 5, 1938.  P. ANDERSON  2,113,341
EROSION CONTROLLING IMPLEMENT
Filed May 20, 1937  3 Sheets-Sheet 3

Inventor
Philip Anderson
By Clarence A. O'Brien
Hyman Berman
Attorneys

Patented Apr. 5, 1938

2,113,341

UNITED STATES PATENT OFFICE 2,113,341

EROSION CONTROLLING IMPLEMENT

Philip Anderson, Meriden, Iowa

Application May 20, 1937, Serial No. 143,839

2 Claims. (Cl. 97—55)

This invention relates to an implement for controlling erosion, the general object of the invention being to provide means for forming a plurality of furrows in the soil, the furrows being frequently interrupted by dams which extend at right angles to the direction of cultivation of a field.

Another object of the invention is to make the implement in the form of an attachment for a tractor, with means for actuating the movable parts of the implement from the tractor.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 1:
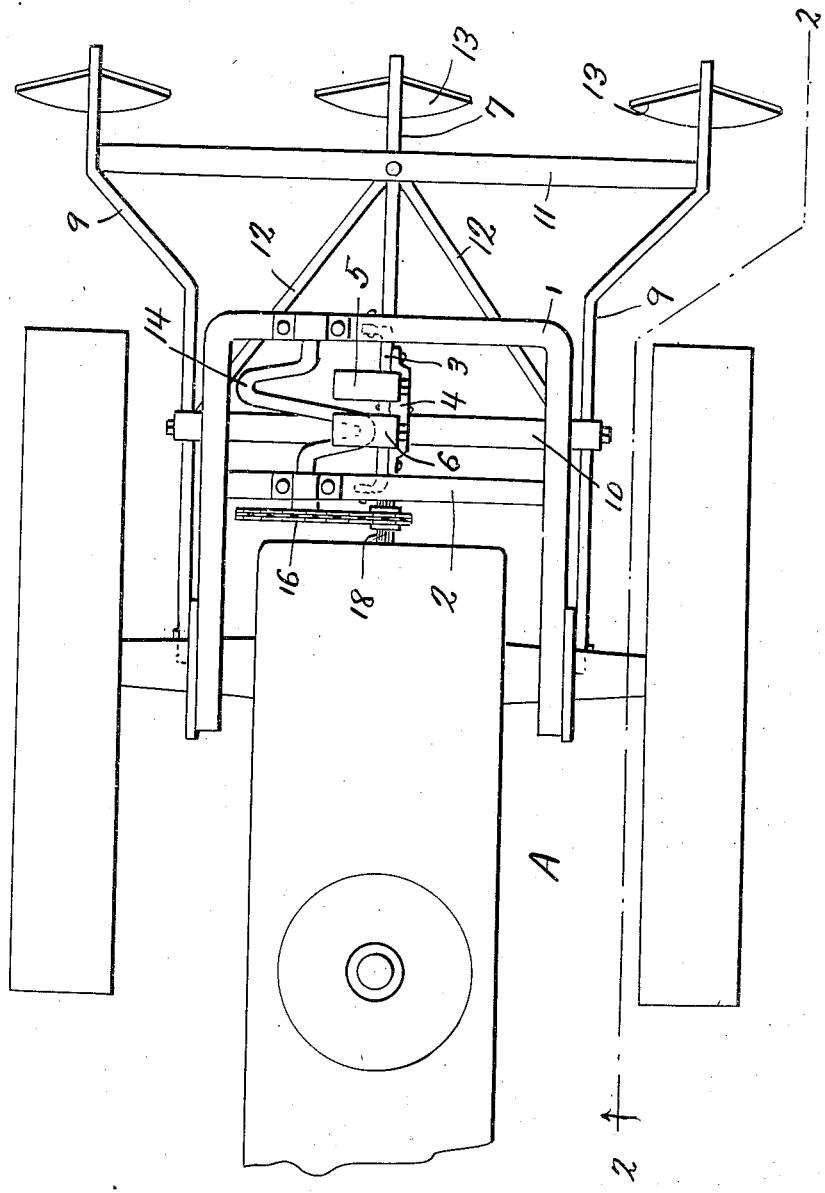
Figure 1 is a fragmentary plan view of a tractor, showing the implement attached thereto.
Figure 2:
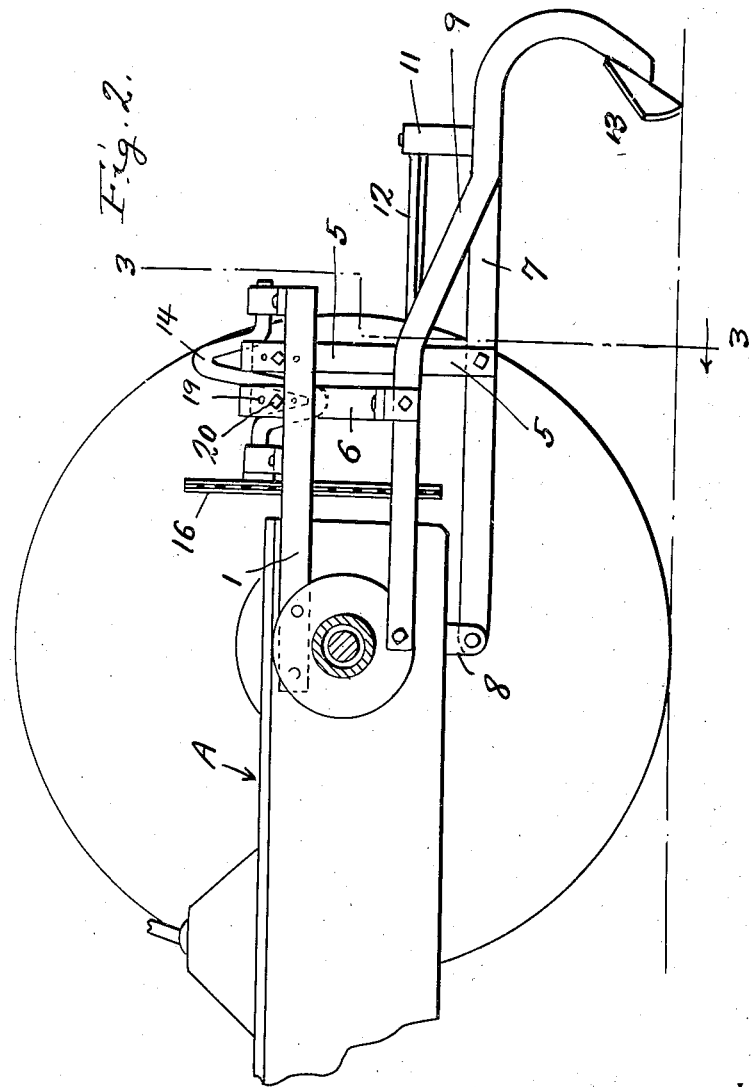
Figure 2 is a section on line 2—2 of Figure 1.
Figure 3:
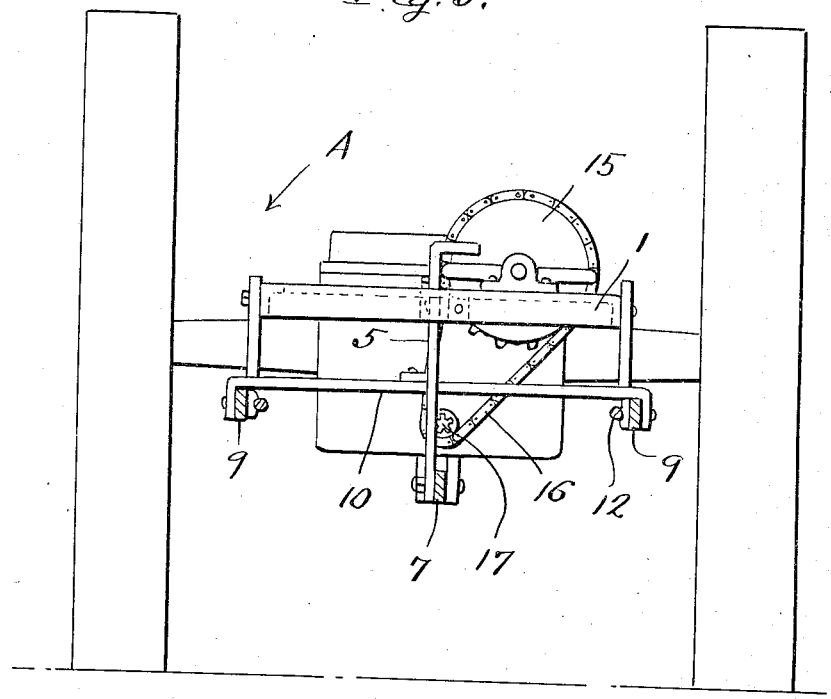
Figure 3 is a section on line 3—3 of Figure 2.
Figure 4:
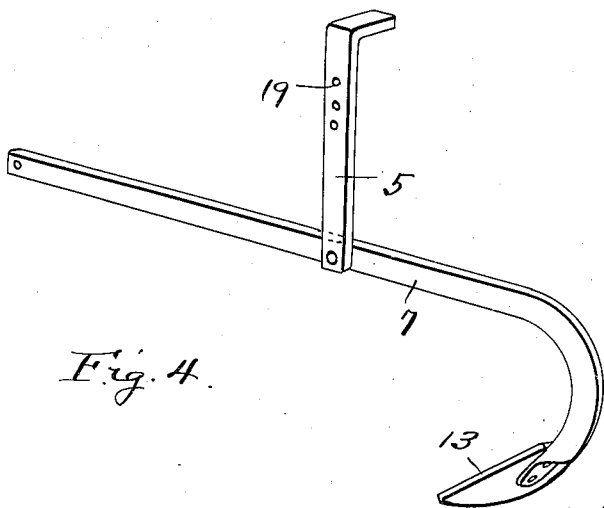
Figure 4 is a perspective view of the center beam.

In these drawings, the numeral 1 indicates a substantially U-shaped frame having the extremities of its limbs connected by bolts or the like, with the rear part of a tractor A, the frame extending rearwardly and said frame also includes the cross piece 2 and the longitudinally extending piece 3 connected to the rear part of the frame and to the cross piece 2 and carrying the slotted part 4 which provides a pair of guides for the vertically arranged L-shaped bars 5 and 6, the bar 5 being connected to the central beam 7 which is pivoted at its front end to a lug 8 depending from a part of the tractor. A pair of side beams 9 is pivoted to the rear axle housing or other part of the tractor, and these beams 9 are connected together by the cross pieces 10 and 11 and the braces 12. The L-shaped bar 6 is connected at its lower end with the front cross piece 10 so that when this member 6 is moved vertically, the side beams 9 together with the parts 10, 11 and 12, are also moved.

A plow 13, preferably of the shape shown in the drawings, is attached to each of the beams 9 and 7, and the beams 9 are bent as shown in Figure 1, so that their plows will be in alignment with the rear wheels of the tractor, with the plow of the center beam 7 centrally located between the other two plows.

A double crank shaft 14 has its ends journaled in the bight of the frame 1 and the cross piece 2, with its cranks arranged to engage the short arms of the bars 5 and 6, so as to alternately raise these bars and, therefore, the plow beams. A sprocket wheel 15 is connected to the front end of the crank shaft and a chain 16 passes over this wheel and a small sprocket wheel 17, which is connected to the take-off shaft of the tractor, said shaft being shown at 18.

Any suitable means can be used for holding the plows in raised position when not in use, and for adjusting the depth the plows will enter the ground. The drawings show such means as being a vertical row of holes 19 in each L-shaped bar and a bolt or pin 20 adapted to engage any one of the holes, a portion of the pin or bolt being adapted to engage the member 4 to limit downward movement of the L-shaped bar and therefore the plow or plows. By placing the pin in the bottom hole, a plow will be held above the ground, so that the device can be transported from place to place, and then by placing the pins in other holes, the depth a plow will enter the ground may be regulated.

As will be understood, the rotation of the crank shaft 14 will alternately raise the L-shaped bars 5 and 6 so that the center plow and the two side plows will be alternately raised and lowered, and thus these plows will make short furrows, with the furrows of each row separated by dams or mounds of earth which extend at right angles to the line of travel and cultivation. Thus water is prevented from running down the furrows, as would occur if the furrows were continuous and these dams will hold the water and cause it to be absorbed by the soil very quickly.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:

1. An implement of the class described comprising a frame, means for attaching the same to a tractor, a center plow beam pivoted to the frame, side beams pivoted to the frame, means for connecting the side beams together, L-shaped rods supported for vertical movement in the frame, one rod being connected with the center beam and the other with the side beams, a crank shaft journaled in the frame and having a pair of cranks for engaging the L-shaped members for alternately raising said members, and means for driving the crank shaft from the tractor.

2. An implement of the class described comprising a frame, plow beams pivoted in the frame for vertical swinging movement, L-shaped rods supported for vertical movement in the frame and having the lower ends connected with the beams, a crankshaft journaled in the frame and having its cranks arranged to engage the L-shaped members and means for rotating the crankshaft.

PHILIP ANDERSON.